United States Patent [19]

Marion

[11] Patent Number: 4,699,631
[45] Date of Patent: Oct. 13, 1987

[54] PARTIAL OXIDATION OF HYDROCARBON GASES

[75] Inventor: Charles P. Marion, Mamaroneck, N.Y.

[73] Assignee: Texaco Development Corp., White Plains, N.Y.

[21] Appl. No.: 947,185

[22] Filed: Dec. 29, 1986

[51] Int. Cl.⁴ .......................... C10J 3/46; C01B 3/36
[52] U.S. Cl. ............................ 48/197 R; 48/196 R; 252/373
[58] Field of Search .................. 98/197 R, 196 R; 48/212, 215; 252/373

[56] References Cited

U.S. PATENT DOCUMENTS

| | | | |
|---|---|---|---|
| 1,971,728 | 8/1934 | Perry | 48/196 R |
| 2,483,132 | 9/1949 | Gaucher | 48/196 R |
| 2,491,518 | 12/1949 | Riblett | 252/373 |
| 2,701,756 | 2/1955 | Eastman et al. | 252/373 |
| 2,701,757 | 2/1955 | Riblett | 48/196 R |
| 2,702,238 | 2/1955 | Hays | 48/196 R |
| 2,941,877 | 6/1060 | Grahame | 48/215 |
| 2,987,386 | 6/1961 | Chapman et al. | 48/196 R |
| 3,232,727 | 2/1966 | Guptill et al. | 48/196 R |
| 3,528,930 | 9/1970 | Schlinger et al. | 48/215 |
| 3,884,648 | 5/1975 | Crouch | 252/373 |

Primary Examiner—Peter Kratz
Attorney, Agent, or Firm—Robert A. Kulason; James J. O'Loughlin; Albert Brent

[57] ABSTRACT

Disclosed in a pox process for producing hydrogen and carbon monoxide gaseous mixtures. The specific oxygen consumption is maintained between 212 to 235 employing a hydrocarbon feed gas while controlling soot production to 0.1 to 3 weight percent of the total feed carbon.

22 Claims, 3 Drawing Figures

PARTIAL OXIDATION OF HYDROCARBON GASES

FIELD OF THE INVENTION

This invention relates to partial oxidation of hydrocarbon gases, e.g. natural gas, for the production of gaseous mixtures comprising synthesis gas, reducing gas, or fuel gas.

Partial combustion of methane with substantially pure oxygen to produce carbon monoxide and hydrogen has long been recognized. See coassigned U.S. Pat. No. 2,582,938—duBois Eastman and Leon P. Gaucher. However, to avoid (1) loss due to unconverted carbon and (2) difficulty due to soot in downstream equipment, it was found to be necessary in prior-art partial oxidation processes with gaseous feedstocks to operate the syngas generator so that substantially no carbon was formed. Therefore, the oxygen consumption was relatively high. The oxygen consumption was usually greater than 245 standard cubic feet per thousand standard cubic feet of $H_2+CO$ produced. The temperature in the gas generator was in the range of about 2,400 to 2,600° F. The heating value of the $H_2+CO$ produced was only about 84% of that of the natural gas feed.

It has been unexpectedly found that by the following improved partial-oxidation process, synthesis gas, reducing gas, and fuel gas can be more economically produced from hydrocarbon gases.

SUMMARY

In accordance with certain of its aspects, this invention is directed to an improved partial-oxidation process for the production of gaseous mixtures comprising $H_2$, CO, and other gaseous materials from hydrocarbon feed gas by the steps of:

(1) optionally heating a stream of hydrocarbon feed gas with or without admixture with a hydrocarbon and-/or hydrogen-containing recycle gas stream preferably to a temperature in the range of about 300° F. to 1400° F., such as about 300° F. to 850° F. and suitable for (a) desulfurizing (if necessary) the resulting gas stream, and (b) vaporizing any water injected into this gas stream)

(2) mixing said preheated gas mixture from (1) with an aqueous dispersion of recycled carbon soot;

(3) heating said mixture from (2) to a temperature in the range of about 300° F. to 1400° F., such as about 700° F. to 1000° F., to completely vaporize said slurry water and completely disperse said soot particles in said mixture of hydrocarbon feed gas and recycle gas, if any;

(4) reacting said heated mixture from (3) with a stream of preferably preheated free-oxygen-containing gas whose temperature is in the range of about ambient to 1800° F. in a refractory-lined free-flow down-flow partial-oxidation reaction zone free from catalyst and packing to produce a raw effluent gas stream at a temperature in the range of about 1700° F. to 2400° F., and a pressure in the range of about 1 to 250 atmospheres, and substantially comprising $H_2$, CO, $CO_2$; at least one gas from the group consisting of $H_2O$, $CH_4$, $N_2$, Ar, $H_2S$, COS; and entrained free-carbon soot; so that the atomic ratio of free oxygen to carbon in the total feed to said reaction zone is in the range of about 0.75 to 1.15; the specific oxygen consumption is in the range of about 212 to 235; the dwell time is normally in the range of about 2.5 to 10, such as about 3 to 6 seconds; and said free-carbon soot is produced (single-pass basis) in the range of about 0.1 to 3.0 weight percent of the total carbon content of said mixture of hydrocarbon feed gas, recycle soot-water, and recycle gas, if any, in the feed;

(5) cooling the raw effluent gas stream from (4) to a temperature in the range of about 100° F. to 800° F. by indirect heat exchange with a coolant, such as water or other medium, and/or by direct contact with water in a gas-quenching and/or gas-scrubbing zone; and scrubbing the partially cooled raw effluent gas stream with water in a gas-scrubbing zone to produce a substantially soot-free stream of synthesis gas, reducing gas of fuel gas, and a separate aqueous dispersion stream of carbon soot;

(6) concentrating said aqueous dispersion, if necessary, to produce a pumpable soot-$H_2O$ dispersion comprising from about 0.5–4.0 wt. % of carbon soot; and, (7) recycling substantially all of said soot-$H_2O$ dispersion to (2) for mixing with said gas mixture from (1).

BRIEF DESCRIPTION OF THE DRAWING

The invention will be further understood by reference to the accompanying drawing. The drawing is a schematic representation of a preferred embodiment of the process.

Figure 1:
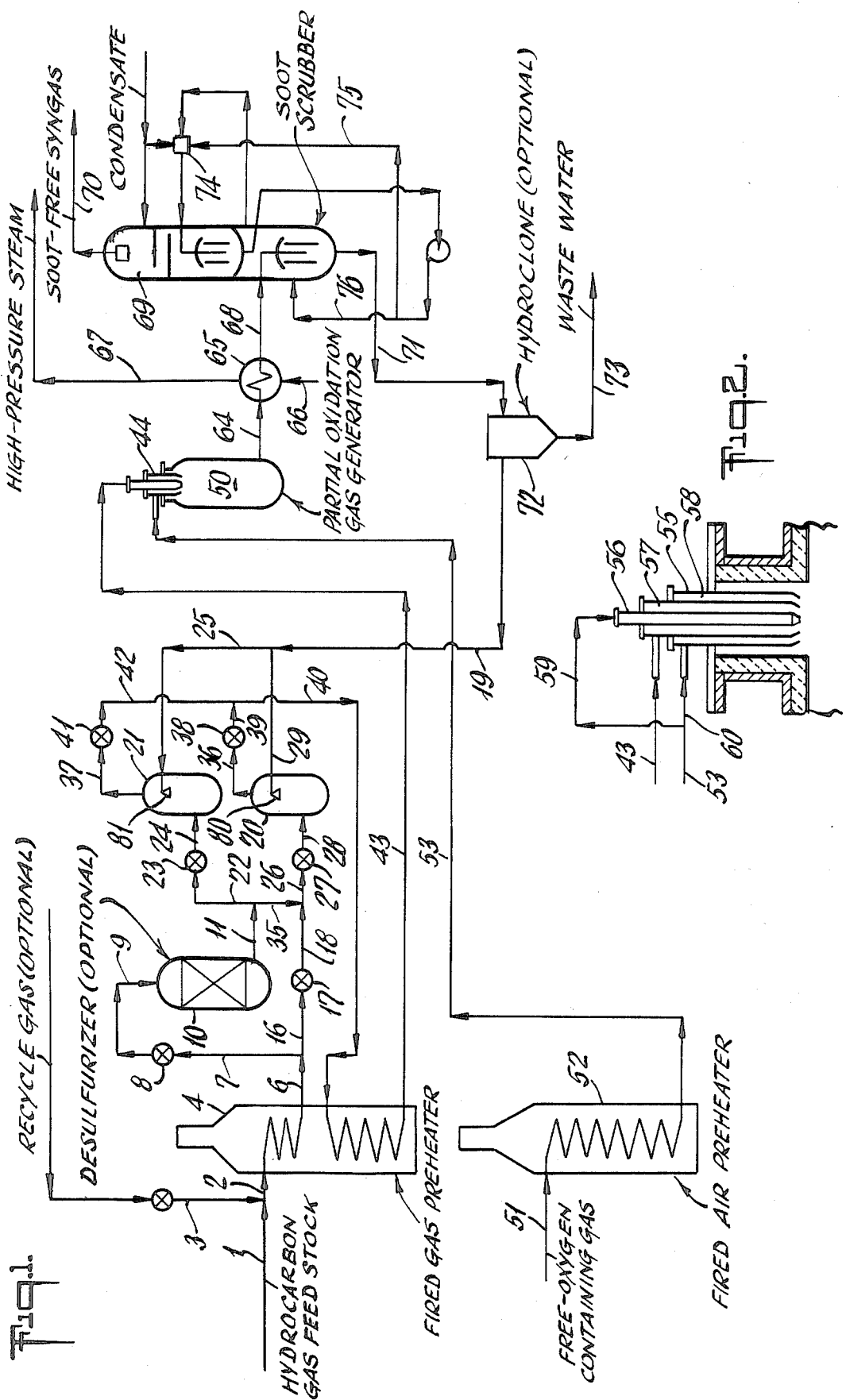
FIG. 1 shows a process schematic.

FIG. A provides a comparison perforamance graph.

DESCRIPTION OF THE INVENTION

The present invention is an improved partial-oxidation process for producing gaseous mixtures comprising $H_2+CO$, i.e. synthesis gas, reducing gas or fuel gas. The primary constituents in synthesis gas are $H_2$ and CO, and the $H_2/CO$ mole ratio of the synthesis gas is determined by the desired end product. The amount of each gaseous constituent in the product gas determines the use of the gas mixture. Reducing gas is rich in $H_2+CO$, but it is lean in $H_2O+CO_2$; and fuel gas comprises $H_2$, CO and $CH_4$.

In the process, a hydrocarbon feed gas in admixture with an aqueous dispersion of recycled carbon-soot is introduced into a syngas generator that includes a free-flow vertical refractory-lined reaction zone free from packing and catalyst. In this zone, the feed gas reacts by partial oxidation with a free-oxygen-containing gas which is also introduced into the reaction zone. The temperature in the reaction zone is in the range of about 1700° F. to 2400° F., such as about 1800° F. to 2200° F. The pressure in the reaction zone is in the range of about 1 to 250 atmospheres, such as about 15 to 100 atmospheres. The dwell time in the gas generator is about 2.5 to 10 seconds such as about 3 to 6 seconds.

By definition, the hydrocarbon gas feed to the syngas generator, also referred to as the reactor, is saturated and unsaturated hydrocarbon gases from the group consisting of $C_1$ to $C_6$, and mixtures thereof. For example, the hydrocarbon feed gas may comprise from about 40 to 100 volume % $CH_4$. The sulfur content of the hydrocarbon feed gas may be in the range of about 0 to 400,000 parts per million. Typical hydrocarbon feed gas streams include all of the normally gaseous hydrocarbons and mixtures thereof. Natural gas is a preferred hydrocarbon feed gas. Optionally, a stream of recycle gas may be mixed with the hydrocarbon feed gas. For example, the ratio of recycle gas to hydrocarbon feed gas may be in the range of about 0 to 1, such as about 0.01 to 0.10 parts by volume of recycle gas for each volume of hydrocarbon feed gas. The recycle gas may be any waste gas stream in the system or any off-site gas containing hydrocarbons and/or hydrogen, e.g. ammonia-loop purge, cryogenic off-gas.

The hydrocarbon feed gas stream, with or without said recycle fuel gas, is optionally heated to temperature in the range of about 300° F. to 850° F., such as about 500° to 800° F. in a preheater. When the feed gas stream contains more than a few parts per million of sulfur, it may be passed through a guard chamber filled with zinc oxide or other active adsorbent to desulfurize the gas. It is not necessary to desulfurize a feed gas stream which contains sulfur as far as partial oxidation is concerned, but desulfurization is usually advantageous for downstream processes. The partially preheated, and desulfurized if necessary, hydrocarbon gas stream is mixed with a dispersion of recycled soot-$H_2O$ to produce a feed mixture which is preheated to a temperature in the range of about 300° F. to 1400° F. and then introduced into the syngas generator and reacted by partial oxidation with a stream of free-oxygen-containing gas.

By definition, the term free-oxygen-containing gas is selected from the group consisting of air, oxygen-enriched air i.e. more then 21 mole % oxygen, and substantially pure oxygen i.e. at least 95 mole % oxygen. Air is a preferred free-oxygen-containing gas only when large amounts of nitrogen in the syngas can be utilized, tolerated, or economically removed. The O/C ratio (atoms of free oxygen divided by atoms of carbon) in the partial oxidation reaction zone is in the range of about 0.75 to 1.15, depending on the purity of the free-oxygen-containing gas stream and the preheat level of the feed streams. For example, for substantially pure oxygen the O/C atomic ratio is in the range of about 0.75 to 0.95. For air and oxygen enriched air, the O/C atomic ratio is in the range of about 0.85 to 1.15.

The gaseous composition of the raw effluent gas stream from the reaction zone in mole % is as follows: $H_2$ 10.0 to 68.0, CO 15.0 to 60.0, $CO_2$ 1.0 to 30.0, $H_2O$ 2.0 to 50.0, $CH_4$ 0.0 to 28.0, $H_2S$ 0.0 to 20, COS 0.0 to 3.0, $N_2$ 0.0 to 60.0, Ar 0.0 to 1.8, and $NH_3$ 0 to 0.02. Also included in the hot effluent gas stream is free-carbon soot in the range of about 0.1 to 3.0 weight percent of the total carbon content of said mixture of hydrocarbon feed gas, recycle soot-water, and recycle gas, if any.

A more complete understanding of the invention may be had by reference to the accompanying drawing which illustrates a preferred embodiment of the invention, in which a conventional partial-oxidation syngas generator is continuously operated.

As shown in FIG. 1 of the drawing, a hydrocarbon feed gas stream, e.g. natural gas and/or other hydrocarbon gases in line 1 is optionally mixed in line 2 with a hydrocarbon- and/or hydrogen-containing recycle gas stream from line 3. For example, the hydrocarbon feed gas and/or hydrocarbon recycle gas stream may comprise about 40 to 100 volume % $CH_4$. In one embodiment, the stream of recycle gas may contain 0–20 mole % hydrocarbons and is at a temperature in the range of about ambient to 600° F. The volumetric percent of recycle hydrocarbon- and/or $H_2$-containing gas in its mixture with the hydrocarbon feed gas is in the range of about 0 to 50, such as about 1 to 10. At ambient temperature the gas from line 2 is heated in one or more stages to a temperature in the range of about 600° F. to 1400° F. in preheater 4. Other means for supplying at least a portion of the heat to heat the gas from line 2 may be used, such as by indirect heat exchange against hot syngas or steam, such as steam that is produced in the synthesis-gas cooler. Optionally, the hydrogen- and/or hydrocarbon-containing recycle stream, is a cryogenic off-gas from the gas-purification zone (not shown). For example, in one embodiment said feed steam of hydrocarbon gas with hydrocarbon- and/or hydrogen-containing recycle gas in (1) comprises at least 20 mole % of hydrocarbons and is at a temperature in the range of about ambient to 600° F.

The heated mixture of hydrocarbon feed gas in line 6 may be optionally desulfurized by being passed through line 7, valve 8, line 9, and zinc-oxide-containing desulfurizer 10. The desulfurized gas containing less than one part per million of sulfur is passed out through bottom line 11. Desulfurizer 10 may be a vessel containing zinc oxide or other active adsorbent and may be by-passed by passing the hydrocarbon feed gas stream in line 6 through line 16, valve 17, and line 18. All of the hydrocarbon feed gas stream in lines 11 or 18 is mixed with a pumpable aqueous slurry containing 0.5 to 4 wt. % of carbon soot from line 19 in mixing vessels 20 or 21. Thus, the hydrocarbon feed gas stream in line 11 may be passed through line 22, valve 23, line 24 into mixing vessel 21. Simultaneously, the aqueous dispersion of carbon soot in line 19 may be passed through line 25 into mixing vessel 21. Similarly, the hydrocarbon feed gas stream in line 18 may be passed into mixing vessel 20 by way of line 26, valve 27, and line 28. Alternatively, with valves 17 and 23 closed the hydrocarbon feed gas stream in line 11 may be passed into mixing vessel 20 by way of lines 35, 26, valve 27 and line 28. Mixing vessels 20 and 21 are equipped with internal spray nozzle(s), such as 80 and 81 respectively, arranged to atomize the soot-water recycle so that it evaporates without impingement of water droplets on the vessel or pipe walls.

Mixing vessels 20 and 21 may be used simultaneously or separately. The mixture of hydrocarbon feed gas and aqueous carbon-soot dispersion in mixing vessels 20 and 21 is removed respectively through line 36, valve 38, line 39, line 40; or through line 37, valve 41, line 42, and line 40. Alternatively, mixing of the streams may take place by passing the stream of hydrocarbon feed gas through the main axial passage of a T-mixer, venturi mixer, or combination thereof while simultaneously passing an aqueous dispersion of carbon soot through at least one other passage in said mixer, which can be perpendicular to said main axial passage. The mixture of hydrocarbon feed gas and aqueous carbon-soot dispersion in line 40 is passed through the coils in preheater 4 and heated to a temperature in the range of about 600° F. to 1400° F., such as about 700° F. to 1000° F. The heated mixture in line 43 is passed through down-firing burner 44 located in the upper head of partial-oxidation reactor 50.

Simultaneously, a free-oxygen-containing gas stream in line 51 is heated to a temperature in the range of about ambient to 1800° F. in fired preheater 52 and then passed through line 53 and burner 44 into the reaction zone of gasifier 50. Intimate mixing of the gas streams takes place at or near the tip of burner 44.

Figure 2:
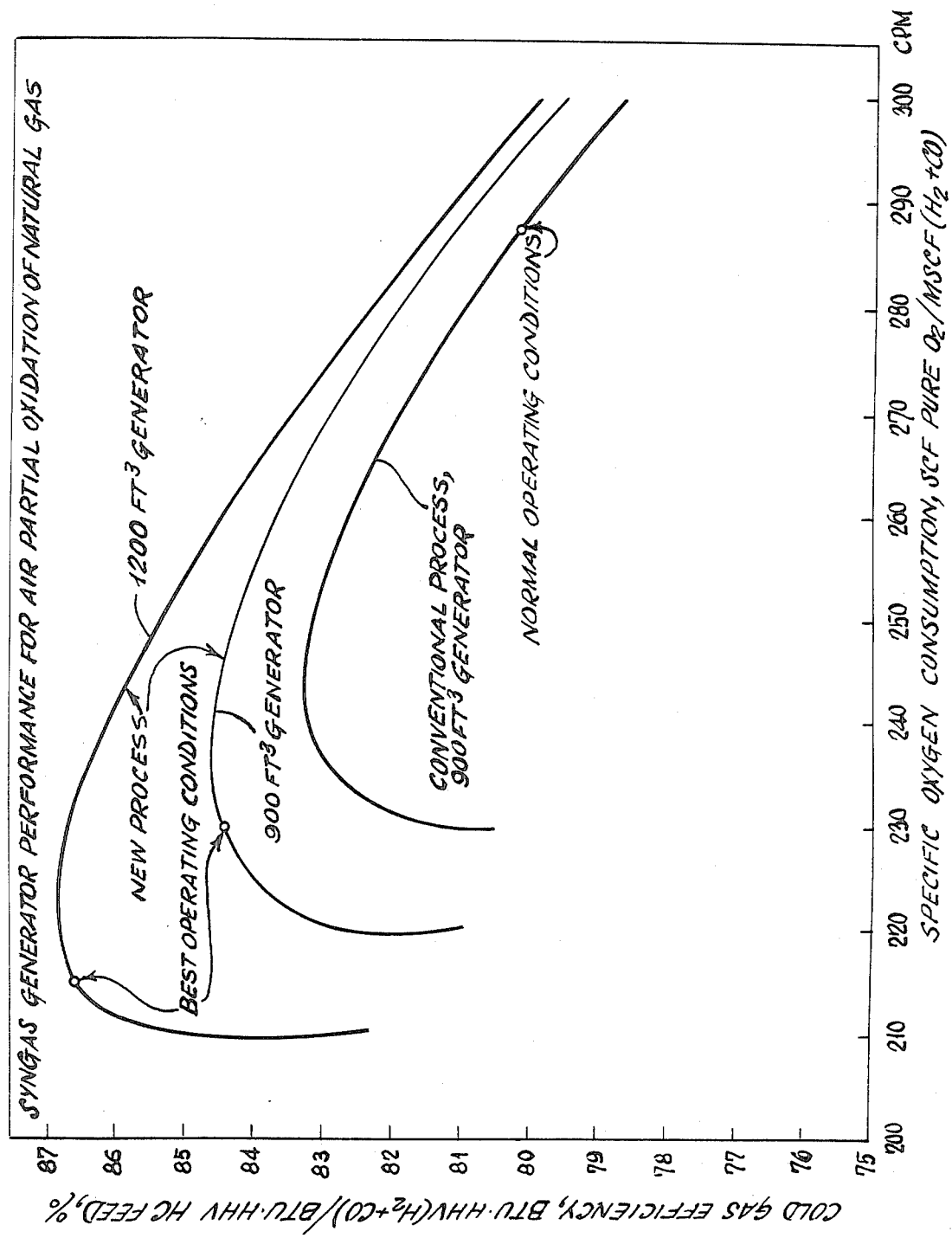
FIG. 2 shows a 3-steam burner.

Burner 44 may be a 2-, 3-, or multi-passage burner. For examples of suitable burners, reference is made to coassigned U.S. Pat. No. 3,874,592; 3,847,564; 4,386,941, and 4,443,230, which are incorporated herein by reference. For example, a three-stream burner 55 may be used as shown in FIG. 2. Burner 55 comprises central conduit 56, an intermediate coaxial conduit 57 surrounding said central conduit and forming an annular passage therewith through which said preheated mixture of hydrocarbon feed gas with or without admixture with a hydrocarbon- and/or hydrogen/containing recycle gas stream and a gaseous-phase aqueous dispersion of carbon-soot in line 43 is passed, and an outer coaxial annular passage 58 surrounding said intermediate conduit. The preheated free-oxygen-containing gas in line 53 is split into two separate streams. One stream 59 passes through the central conduit 56, and the other free-oxygen-containing gas stream 60 passes through outer annular passage 58. In a similar embodiment of the subject process, the preheated mixture of hydrocarbon feed gas with or without admixture with a hydrocarbon- and/or hydrogen-containing recycle gas stream is split into two separate streams. One of said streams passes down through said central conduit, and the other of said streams passes through the outer annular passage of the three-stream burner comprising a central conduit, an intermediate annular passage surrounding said central passage, and an outer annular passage surrounding said intermediate annular passage. The stream of free-oxygen-containing gas passes down through said intermediate annular passage.

In still another embodiment employing a three-passage burner, a stream of hydrocarbon feed gas with or without admixture with a hydrocarbon- and/or hydrogen-containing recycle gas stream and preheated to a temperature in the range of about 300° F. to 1400° F., such as about 300° F. to 850° F., is passed through central conduit 56 or outer annular passage 58. A liquid or gaseous-phase aqueous dispersion comprising 0.5 to 4 wt. % of carbon-soot at a temperature in the range of about ambient −1400° F. is passed through the intermediate annular passage, and a stream of free-oxygen-containing gas at a temperature in the range of about ambient to 1800° F. is passed through the remaining free passage in the burner and into the reaction zone of the gas generator. In such case, mixing and heating of the reactants take place in the partial-oxidation gas generator.

In a similar embodiment of the subject process, the feed gas mixture is passed through the intermediate or outer annular passages of a three-passage burner comprising a central passage, a concentric intermediate annular passage, and a concentric outer annular passage. The aqueous dispersion of recycle carbon soot is passed through the central passage; and the stream of free-oxygen-containing gas is passed through the remaining free passsage in said burner. The velocity of any gaseous stream passing through the central conduit of a three-stream burner may be in the range of about 50 feet per second to sonic velocity. The velocity of any gaseous stream passing through any annular passage in the burner is in the range of about 150 feet per second to sonic velocity. The velocity of an aqueous dispersion of carbon-soot passing through any passage in the burner is about 1-50 feet per second with a liquid-phase dispersion and about 150 feet per second to sonic velocity with a vaporized dispersion.

The hot effluent gas stream leaving syngas generator 50 by way of line 64 at a temperature in the range of about 1700° F. to 2400° F., such as about 1800° F. to 2200° F., is cooled to a temperature in the range of about 100° F. to 800° F. by first passing the hot raw effluent gas stream in line 64 through gas cooler 65 in which the hot raw effluent gas stream is cooled to a temperature in the range of about 400° F. to 1700° F. and then by quenching and scrubbing and partially cooled gas stream in line 68 with water in two-stage scrubber 69. The hot raw gas stream is cooled in gas cooler 65 by indirect heat exchange with condensate or boiler-feed water from line 66. By-product high-pressure steam is produced and leaves gas cooler 65 by way of line 67. Entrained particulate carbon in the partially cooled effluent gas stream in line 68 is removed by scrubbing the gas stream with water in conventional two-stage gas scrubber 69. Cooled soot-free product gas leaves scrubber 69 through line 70 at the top of gas scrubber 69. A pumpable aqueous dispersion of carbon soot having a solids content in the range of about 0.5 to 4.0 weight percent, such as about 1.0 to 2.0 wt. %, leaves through line 71 at the bottom of gas scrubber 69. If necessary to achieve said solids concentration, any suitable means may be used to concentrate the aqueous dispersion of carbon soot in line 71 to a solids content in the range of about 1.0 to 4.0 wt. %. For example, a conventional hydroclone 72 is shown in the drawing. Waste water leaves at the bottom of the hydroclone through line 73. Concentrated aqueous dispersion of carbon soot is removed at the top of hydroclone 72, and the pumpable concentrated dispersion is recycled to mixing vessels 20 and 21 by way of line 19. Alternatively, the soot-water dispersion may be concentrated in two-stage gas scrubber 69 by recycling most of the water from the upper section back to the scrubber orifice 74 by way of line 75, and pumping only a small quantity of this water into the lower section by way of line 76.

Under previous operating conditions, partial oxidation of natural gas with air took place at a temperature in the reaction zone of about 2400° F. to 2600° F. The Specific Oxygen Consumption (SOC), i.e. standard cubic feet (SCF) of pure oxygen consumed per thousand standard cubic feet (MSCF) of ($H_2$+CO) produced was in the range of about 245–270. The related Cold Gas Efficiency (CGE), i.e. high heating value (BTU) of $H_2$+CO in the product gas divided by the high heating value (BTU) of the hydrocarbon gas feed was usually in the range of about 83–84%.

It has been unexpectedly found that, by the improved process, maximum Cold Gas Efficiency (CGE) can be achieved when O/C ratio is decreased and 100% of the resulting increased single-pass soot yield in the product gas is recovered and recycled to extinction in admixture with the hydrocarbon gas feed. Further, the Specific Oxygen Consumption (SOC) is in the range of about 212 to 235, and the temperature in the reaction zone is dropped to the range of about 1700° F. to 2400° F. The Cold Gas Efficiency of the improved process is increased to a value in the range of about 84.5 to 86.5.

For the case of air partial oxidation, this improvement can be illustrated by reference to the attached FIG. A, a graph of CGE versus SOC, which are the two parameters, respectively, of consumptions of the two principal raw materials, hydrocarbon feed (natural gas) and oxygen (compressed air). The lower curve represents conventional air partial oxidation of hydrocarbon gases without soot recycle. This curve is generated by successive operating points as feed O/C atomic ratio is increased from left to right. For all points to the left of maximum CGE, CGE decreases as O/C ratio is lowered and more residual methane and unconverted soot (free carbon) are produced. For points to the right of this same maximum, CGE decreases as O/C ratio is raised because, even though methane and carbon are decreasing, the yield of ($H_2$+CO) is falling because of more complete oxidation to $H_2O$+$CO_2$. The Normal Operating Conditions point for conventional partial oxidation is constrained to a relatively inefficient region, at high O/C and temperature, so that substantially zero soot will be produced.

The upper curves in FIG. A represent the improved partial-oxidation process of the subject invention with all soot being recycled and the O/C ratio for each point corresponding to the total carbon in both fresh feed and recycle soot. Since all carbon is converted on an overall basis, CGE is always higher for the improved process, except at very high O/C ratios when soot (and methane) production is negligible. To the left of the CGE maxima for the new process, CGE decreases only because of increasing residual methane. As a general correlation, residual methane always increases as (1) temperature falls and (2) residence time in the reaction zone decreases. Best Operating Conditions for the improved process will be at a point to the left of maximum CGE on each curve. At these optimum points the cost savings in SOC, compared to the SOC at maximum CGE, just balances the losses of CGE compared to its maximum value. The exact location of this optimum-operating-cost point depends, of course, on the relative unit costs (prices) of hydrocarbon feed (natural gas) and oxygen (compressed air), which are the principal two raw materials.

Further, it has been unexpectedly found in the improved process that by increasing the volume of the reaction zone, up to a limit set by excessive heat loss from this zone, the Cold Gas Efficiency is increased, the Specific Oxygen Consumption is reduced, and the temperature in the reaction zone is reduced. For example, if the volume of the reaction zone is 900 cu. ft. for air partial oxidation of a hydrocarbon gas with all feed conditions held constant, by operating in a 1200 cu. ft. reaction zone, i.e. an increase of $33\frac{1}{3}\%$, the Cold Gas Efficiency is increased from about 84.4 to 86.6%, the Specific Oxygen Consumption is reduced from about 230 to 215, and the temperature in the reaction zone is reduced from about 2056° F. to 1930° F. Advantageously, the volume of the reaction zone for the improved process may be increased in comparison with the volume of the reaction zone for conventional partial oxidation. Typically, this beneficial increase may be in the range of about 10–100% greater. This larger volume may be determined by conventional methods of calculation. Some principles are described in coassigned U.S. Pat. No. 2,582,938, which is incorporated herein by reference. An increase in volume of the reaction zone contributes to the increase in dwell time but also increases heat loss and lowers temperature. Accordingly, whereas the conventional dwell time in the reaction zone of the partial-oxidation reactor is in the range of about 2.0 to 5 seconds for the partial oxidation of a hydrocarbon gas, e.g. methane, the preferred dwell time in the improved process is in the range of about 2.5 to 10 seconds, in order to minimize residual methane. The the volume of the partial-oxidation reaction zone in the subject improved process may be greater than the volume of the reaction zone for conventional partial oxidation by an amount which provides sufficient residence time to reduce residual methane in the raw effluent gas stream from the reaction zone to the minimum achievable at the lower feed O/C atomic ratio but with all other independent variables held constant.

Beyond the simple optimization indicated above of raw-material costs alone, it is possible to optimize the improved process fully with respect to both operating and fixed costs, as outlined below:

| Operating Costs | Fixed Costs |
|---|---|
| hydrocarbon feed gas | feed and preheating equipment |
| oxidant (air or oxygen) | burner construction & reactor volume |
| credit for steam produced | gas-cooling equipment |
| other utilities, eg. fuel & power | soot-recovery and recycle equipment |
| other requirements, e. g. operating man power | |

To optimize both design and operation, all of the above costs are calculated for two or three points near the Best Operating Conditions point for the improved process with a given reactor volume in FIG. A. By repeating this calculation procedure for at least two other reaction volumes, it is possible to select the optimum design and operating conditions.

In one embodiment of the subject process raw-materials maybe optimized by adjusting the feed oxygen/carbon ratio (number of atoms of free oxygen in the oxidant stream divided by number of atoms of carbon in the stream of fresh hydrocarbon feed gas plus recycle soot-water plus recycle hydrocarbon and/or hydrogen-containing gas) so that the resulting specific oxygen consumption, SCF pure $O_2$/MSCF ($H_2$+CO), and cold-gas efficiency, Btu HHV ($H_2$+CO)/Btu HHV hydrocarbons, lead to a minimum for the total cost of oxidant (air, oxygen-enriched air, or substantially pure oxygen) plus hydrocarbon feed gas per/MSCF of $H_2$+CO) produced. Further, the total operating cost may be optimized by adjusting the feed O/C ratio so that the total net cost of the oxidant stream plus the hydrocarbon feed gas stream plus utilities (primarily preheat fuel but including input steam, electricity, cooling water, and any others) plus any other operating requirements (such as operating manpower) minus a credit for export steam is minimized per/MSCF of ($H_2$+CO) produced. Also, the design of the process unit may be optimized by selecting the design value of feed O/C so that, per MSCF ($H_2$+CO) produced, the net total of all operating costs plus all investment costs (such as for feed and preheating equipment, burner fabrication, reactor volume, gas-cooling and quenching equipment, and soot-recovery and recycle equipment) is minimized. In some cases, there may be a fixed upper limit for effluent methane concentration, determined by downstream-process requirements. For these cases, the feed O/C can be reduced only to a value which keeps exit methane at or below that limit; so the optimization is still carried out but only down to the lowest O/C allowed by such methane limit.

The following example illustrates a preferred embodiment of this invention for the case of using air as oxidant. While a preferred mode of operation is illustrated, the example should not be construed as limiting the scope of the invention.

EXAMPLE 33,376,000 Standard Cubic Feet per day (measured at 60° F. and 14.7 psig) of a mixture comprising natural gas and hydrocarbon-containing recycle gas from the ammonia-loop purge of a downstream process are mixed together and preheated to a temperature of about 700° F. in a fired gas preheater. The composition of the feed gas mixture of natural gas plus recycle gas is shown in Table 1 in mol %:

TABLE 1

| Composition of Feed Gas Mixture | | | |
|---|---|---|---|
| | Mole % | | Mole % |
| Methane | 91.965 | Hydrogen | 2.015 |
| Ethane | 2.141 | Carbon Monoxide | 1.119 |
| Propane | 0.632 | Argon | 0.005 |
| Butane | 0.234 | Nitrogen | 1.714 |
| Pentane | 0.175 | | |

The preheated feed gas mixture is mixed in a mixing vessel with 15,337 pounds per hr. of recycle soot-water dispersion having a solids content of 1.0% and a temperature of 250° F. The mixture is then preheated in a fired gas preheater to produce a dispersion of soot in gas having a temperature of 1050° F. and comprising completely vaporized slurry water and completely dispersed soot particles in natural gas and recycle gas at a pressure of 500 psig.

The particulate-carbon natural-gas feed dispersion is passed through the intermediate annular passage of a burner comprising a central conduit, an intermediate annular passage surrounding said central conduit, and an outer annular passage surrounding said intermediate passage. Simultaneously, 842 short tons per operating day of 100% oxygen contained in air having the composition in mol % shown in Table II below and at a temperature of 1450° F. are split into two streams and passed through the central conduit and the outer annular passage of said burner at a pressure of 500 psig.

TABLE II

| Composition of Oxidant Stream | |
|---|---|
| | Mole % |
| Oxygen | 20.69 |
| Argon | 0.89 |
| Nitrogen | 76.92 |
| Water Vapor | 1.50 |

181,742,000 standard cubic feet per operating day of raw effluent synthesis gas (wet basis) are discharged from the free-flow refractory-lined reaction zone in which the partial oxidation takes place at a temperature of 2056° F., and a pressure of 470 psig.

The raw effluent gas stream is passed through a gas cooler and cooled to a temperature of 623° F. by indirect heat exchange with boiler-feed water. Steam is thereby produced having a temperature of 603° F. and a pressure of 1560 psig. The partially cooled raw effluent gas stream is scrubbed with water in a conventional two-stage soot scrubber. 153 pounds per hr. of soot (unreacted carbon) are removed from the gas stream and form a dispersion with the scrubbing water. The resulting aqueous dispersion of soot comprising 1.0 wt. % of solids is recycled for admixture with the mixture of natural gas plus hydrocarbon- and/or hydrogen-containing recycle gas. Optionally, the soot-water stream may be concentrated in a hydroclone to about 3 wt. %. This concentration, in whatever equipment, is made as high as possible while still maintaining pumpability in order to increase efficiency by minimizing the amount of water to be vaporized. The composition of the soot-free synthesis gas produced is shown in Table III below.

TABLE III

| Composition of Soot-Free Synthesis Gas | | | |
|---|---|---|---|
| | Mole % | | Mole % |
| Carbon Monoxide | 16.11 | Methane | 0.71 |
| Hydrogen | 31.98 | Argon and rare gases | 0.47 |
| Carbon dioxide | 1.74 | Nitrogen and trace | 41.17 |
| Water Vapor | 7.82 | components | |

Various modifications of the invention as hereinbefore set forth may be made without departing from the spirit and scope thereof; and, therefore, only such limitations should be made as are indicated in the appended claims.

I claim:

1. A partial-oxidation process for producing synthesis gas, reducing gas, or fuel gas, comprising:
   (1) providing a stream of hydrocarbon feed gas with or without admixture with a hydrocarbon- and/or hydrogen-containing recycle gas stream at a temperature in the range of about ambient to 1400° F.;
   (2) mixing said gas from (1) with an aqueous dispersion of recycle carbon soot in a gas-liquid mixing means;
   (3) heating said mixture from (2) to a temperature in the range of about 300° F. to 1400° F. to completely vaporize said slurry water and completely disperse said soot particles in said hydrocarbon feed gas and recycle gas, if any;
   (4) reacting said heated mixture from (3) with a stream of preheated free-oxygen-containing gas, whose temperature is in the range of about ambient to 1800° F. in a refractory-lined free-flow partial-oxidation reaction zone to produce a raw effluent gas stream at a temperature in the range of about 1700° F. to 2400° F., and a pressure in the range of about 1 to 250 atmospheres, and substantially comprising $H_2$, $CO$, $CO_2$; at least one gas from the group consisting of $H_2O$, $CH_4$, $N_2$, $Ar$, $H_2S$, $COS$; and entrained free-carbon soot; so that the atomic ratio of free oxygen to carbon in the total feed to said reaction zone is in the range of about 0.75 to 1.15, the Specific Oxygen Consumption is in the range of about 212 to 235, the dwell time is in the range of about 2.5 to 10 seconds, and said free-carbon soot is produced in the range of about 0.1 to 3.0 weight percent of the total carbon content of said mixture of hydrocarbon feed gas, recycle soot-water, and recycle gas, if any;
   (5) cooling the raw effluent gas stream from (4) to a temperature in the range of about 100° F. to 800° F. by indirect heat exchange with water or other medium and/or by direct contact with water in a gas-quenching and/or gas-scrubbing zone; and scrubbing the partially cooled raw effluent gas stream with water in a gas-scrubbing zone to produce a substantially sootfree stream of synthesis gas, reducing gas, or fuel gas; and a separate aqueous dispersion stream of carbon soot;
   (6) providing said aqueous dispersion as a pumpable soot-$H_2O$ dispersion containing from about 0.5–4.0 wt % of carbon soot; and
   (7) recycling substantially all of said soot-$H_2O$ dispersion from (6) to (2) for mixing with said gas mixture from (1).

2. The process of claim 1 in which said hydrocarbon feed gas and/or hydrocarbon recycle gas stream may contain about 40 to 100 volume % $CH_4$.

3. The process of claim 1 in which said hydrocarbon feed gas is natural gas or refinery off gas.

4. The process of claim 1 in which said stream of hydrocarbon gas is mixed with hydrocarbon- and/or hydrogen-containing recycle gas is (1) and contains at least 20 mole % of hydrocarbons and is at a temperature in the range of about ambient to 600° F.

5. The process of claim 1 in which, prior to the mixing in step (2) of claim 1, the hydrocarbon feed gas stream, optionally in admixture with said recycle gas stream, is desulfurized.

6. The process of claim 5 in which said desulfurization takes place in a vessel containing zinc oxide.

7. The process of claim 1 in which said free-oxygen containing gas is selected from the group consisting of air, oxygen-enriched air i.e. more than 21 mole % oxygen, and substantially pure oxygen i.e. at least 95 mole % oxygen.

8. The process of claim 1 in which the volume of said partial oxidation reaction zone is enlarged to provide sufficient residence time to reduce residual methane in the effluent syngas to the minimum achievable at the lower than conventional feed O/C atomic ratio but with all other independent variables held constant.

9. The process of claim 1 in which in step (2) said gas mixture from (1) is mixed with said dispersion of soot-$H_2O$ in a mixing vessel with internal spray nozzle(s) arranged to atomize the soot-water recycle so that it evaporates without impingement of water droplets on the vessel or pipe walls.

10. The process of claim 1 in which in step (2) said gas from (1) is passed through the main axial passage of a mixing means while simultaneously an aqueous dispersion of carbon soot is passed through at least one other passage in said mixer, which passage can be perpendicular to said main axial passage.

11. The process of claim 1 in which said gas-liquid mixing means in (2) is selected from the group consisting of venturi mixer, mixing tee, spray nozzle, mixing vessel, and combinations thereof.

12. The process of claim 1 in which said gas from (1) is passed through the central or outer annular passage of a three passage burner comprising a central passage, a concentric intermediate annular passage, and a concentric outer annular passage; the dispersion of soot-$H_2O$ is passed through the intermediate annular passage of said burner; and the stream of free-oxygen-containing gas is passed through the remaining free passage in said burner.

13. The process of claim 1 in which prior to step (2) the gas produced in step (1) is heated in a fired gas heater to a temperature in the range of about 500° F. to 800° F.

14. The process of claim 1 in which in step (4) said mixture from step (3) is passed through the intermediate annular passage of a three-stream burner comprising a central conduit, said intermediate annular passage surrounding said central passage, and an outer annular passage surrounding said intermediate annular passage; and in which said stream of free-oxygen-containing gas is split into two separate streams with one stream passing down through said central conduit and the remaining stream passing through said outer annular passage.

15. The process of claim 1 wherein step (b) includes the concentrating of said aqueous dispersion of soot in either a two-stage scrubber or a hydroclone means.

16. The process of claim 1 in which in step (4) said mixture from step (3) is split into two separate streams with one stream passing down through said central conduit and the remaining stream passing through the outer annular passage of a three-stream burner comprising a central conduit, an intermediate annular passage surrounding said central passage, and an outer annular passage surrounding said intermediate annular passage; and the stream of free-oxygen-containing gas is passed through said intermediate annular passage.

17. The process of claim 1 in which said gas from (1) is passed through the intermediate or outer annular passages of a three-passage burner comprising a central passage, a concentric intermediate annular passsage, and a concentric outer annular passage; the aqueous dispersion of recycle carbon soot is passed through the central passage; and the stream of free-oxygen-containing gas is passed through the remaining free passage in said burner.

18. The process of claim 1 in which the gas-scrubbing zone in step (5) comprises a two-stage scrubber provided with an upper and a lower chamber and provided with the step of recycling most of the water from the upper chamber back to the upper chamber by way of a scrubber orifice while introducing only a small quantity of this water into the lower chamber.

19. The process of claim 1 provided with the step of adjusting the feed oxygen/carbon ratio so that the resulting specific oxygen consumption and cold-gas efficiency minimizes the total cost of oxidant plus hydrocarbon feed gas per/MSCF of $H_2+CO$ produced.

20. The process of claim 1 provided with the step of adjusting the feed O/C atomic ratio so that the total net cost of the oxidant stream plus the hydrocarbon feed gas stream plus utilities plus any other operating requirements minus a credit for export stream is minimized per MSCF of $H_2+CO$ produced.

21. The process of claim 1 provided with the step of adjusting the O/C atomic ratio so that, per MSCF of $H_2$ and CO produced, and net total of all operating costs plus all investment cost is minimized.

22. The process of claim 1 provided with the step of reducing the O/C atomic ratio to the lowest value which will keep methane concentration in the raw effluent syngas at or below a fixed limit determined by downstream-process requirements.

* * * * *

UNITED STATES PATENT AND TRADEMARK OFFICE
CERTIFICATE OF CORRECTION

PATENT NO. : 4,699,631
DATED : October 13, 1987
INVENTOR(S) : CHARLES P. MARION

It is certified that error appears in the above—identified patent and that said Letters Patent is hereby corrected as shown below:

Column 11 line 5 Change "is" to --in--.

Column 12 line 50 Change "and" to --the--

Signed and Sealed this

Fifteenth Day of March, 1988

Attest:

DONALD J. QUIGG

Attesting Officer

Commissioner of Patents and Trademarks